United States Patent
Fard et al.

(10) Patent No.: US 7,844,842 B2
(45) Date of Patent: Nov. 30, 2010

(54) VARIABLE REFRESH RATE FOR POWER MANAGEMENT

(75) Inventors: Assana Fard, Sunnyvale, CA (US);
Haroon Saleem Sheikh, Campbell, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 12/276,081

(22) Filed: Nov. 21, 2008

(65) Prior Publication Data
US 2010/0131777 A1  May 27, 2010

(51) Int. Cl.
*G06F 1/26* (2006.01)

(52) U.S. Cl. .................. 713/300; 713/320; 713/322; 345/696; 345/698; 345/699

(58) Field of Classification Search ............ 713/300, 713/320, 323, 322; 345/696, 698, 699
See application file for complete search history.

(56) References Cited

U.S. PATENT DOCUMENTS

| | | | | |
|---|---|---|---|---|
| 5,086,495 A | * | 2/1992 | Gray et al. | 345/420 |
| 5,821,940 A | * | 10/1998 | Morgan et al. | 345/420 |
| 5,991,883 A | * | 11/1999 | Atkinson | 713/300 |
| 6,028,586 A | * | 2/2000 | Swan et al. | 345/581 |
| 6,199,139 B1 | * | 3/2001 | Katayama et al. | 711/106 |
| 6,339,778 B1 | * | 1/2002 | Kishi | 1/1 |
| 6,476,800 B2 | * | 11/2002 | Millman et al. | 345/212 |
| 6,603,697 B2 | * | 8/2003 | Janzen | 365/222 |
| 7,193,622 B2 | * | 3/2007 | Sklovsky et al. | 345/204 |
| 7,269,750 B1 | * | 9/2007 | Garritsen et al. | 713/322 |
| 7,538,762 B2 | * | 5/2009 | Fletcher et al. | 345/211 |
| 2004/0125099 A1 | * | 7/2004 | Stanley et al. | 345/211 |
| 2009/0327777 A1 | * | 12/2009 | Vasquez et al. | 713/320 |

FOREIGN PATENT DOCUMENTS

JP    2004193980 A  *  7/2004

* cited by examiner

*Primary Examiner*—Nitin C Patel
(74) *Attorney, Agent, or Firm*—Blakely, Sokoloff, Taylor & Zafman LLP

(57) ABSTRACT

A data processing system refreshes a display at a first frequency when operating in a first power mode. The data processing system refreshes the display at a second frequency when operating in a second mode. The first frequency is higher than the second frequency, and the second power mode is configured to consume less power than the first power mode.

17 Claims, 4 Drawing Sheets

VARIABLE REFRESH RATE FOR POWER MANAGEMENT

FIELD OF THE INVENTION

The various embodiments described herein relate to improving the management of power by a data processing system, and more particularly, improving the endurance of a finite power source.

BACKGROUND OF THE INVENTION

Modern data processing systems are frequently portable devices. For example, a laptop computer may be operated on battery power, rather than plugged into an A/C outlet. Batteries have a finite charge during which the data processing system may be operated. Once the battery is drained, no further operation of the system is possible without using a different battery or connecting the system to A/C power to recharge the battery. Managing and extending battery life is an important design consideration for such devices.

Many different kinds of applications can be run on a portable data processing system, such as video games, spreadsheets, web browsers, and others. Depending on the application, a responsive display is more or less important. For example, a fast-paced video game may become unplayable if the display is not highly responsive. On the other hand, a user performing an analysis on a spreadsheet might not even notice a less responsive display (i.e., display has a lower refresh rate). Refreshing a display (e.g., an LCD panel coupled to a laptop computer) consumes power every time it is performed. Over time, refreshing the display less frequently consumes less power.

SUMMARY OF THE DESCRIPTION

A data processing system, in one embodiment, refreshes a display at a first frequency when operating in a first power mode. The data processing system refreshes the display at a second frequency when operating in a second mode. The first frequency is higher than the second frequency, and the second power mode is configured to consume less power than the first power mode.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Figure 1:
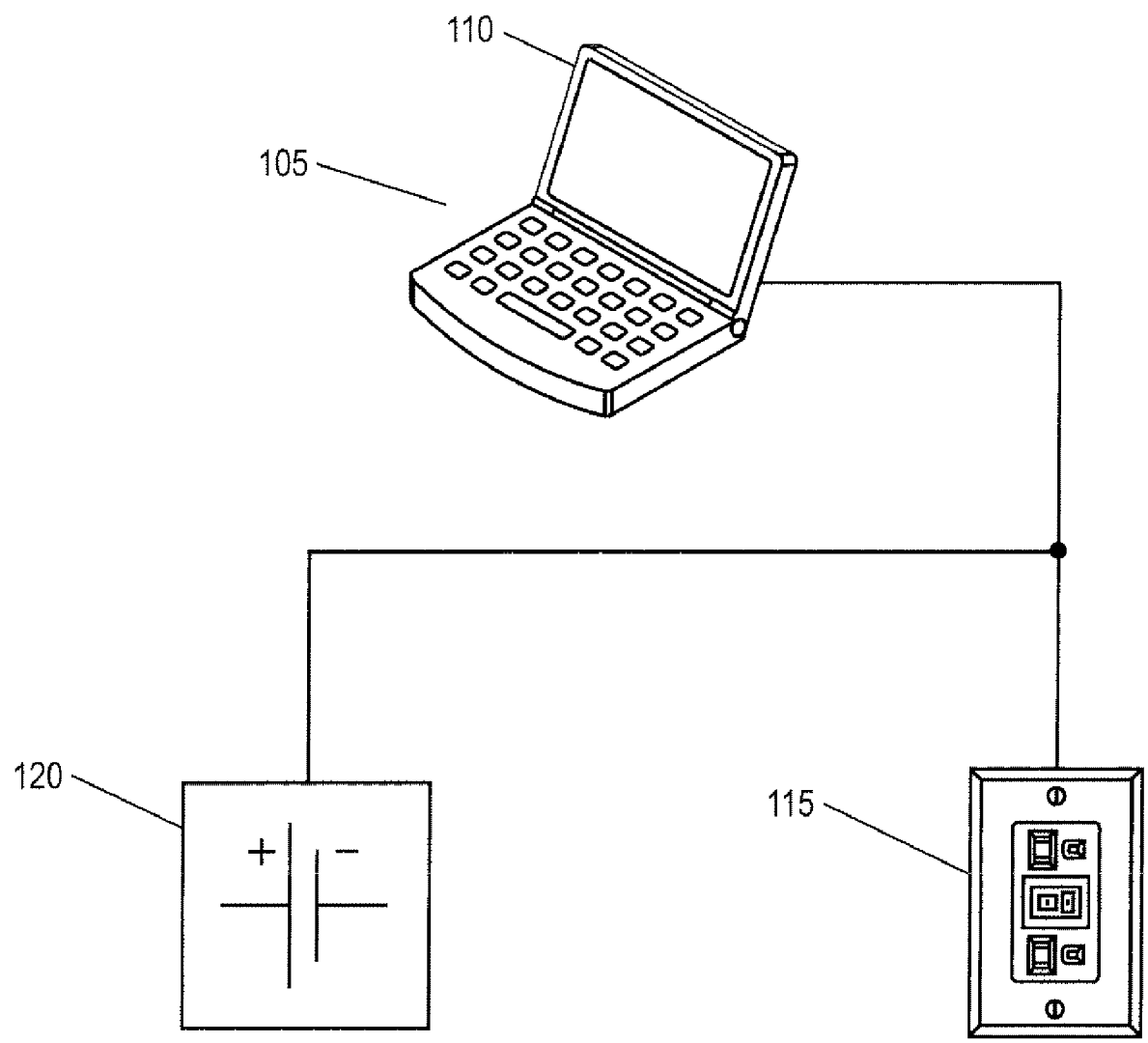
FIG. 1 shows a diagram illustrating a data processing system and power sources suitable for the operation of an embodiment of the invention.

FIG. 1 illustrates a data processing system and power sources suitable for operation of an embodiment of the invention. Data processing system 105 includes display 110 and a processor (not shown). The data processing system may be coupled to A/C power 115 or battery 120. Since A/C power 115 is effectively unlimited, the data processing system 105 may be configured to use more power to produce an increase in performance when coupled to A/C power 115. For example, data processing system 105 may compute and display refreshes to display 110 more frequently while coupled to A/C power 115. Refreshing display 110 more frequently may enhance a user's experience while using data processing system 105 (e.g., playing a video game).

Alternatively, while data processing system 105 is only coupled to battery 120 (e.g., in a meeting, on an airplane, etc.), reducing power consumption may be a higher priority for data processing system 105 than enhancing the user's experience by refreshing the display more frequently. Reducing power consumption by data processing system 105 while coupled only to battery 120 may enhance the amount of time the data processing system 105 continues to function before battery 120 requires recharging.

Refreshing a display (e.g., a LCD coupled to a laptop computer) may consume power in more than one way. For example, determining what data the next refresh should display may require a central processing unit (CPU) to perform update-region calculations. A graphics processor unit (GPU) may need to perform specialized graphics processing to generate data ultimately required by the refresh. The display, such as display 110, must change from displaying the current set of data to the updated set of data. All of these may be components of a display refresh, and each consumes power during operation. Refreshing the display is described in greater detail below in conjunction with FIG. 3. Power consumption attributable to refreshing the display also depends upon how frequently the display is refreshed, as described in greater detail below in conjunction with FIGS. 4A and 4B. By refreshing the display with greater frequency (i.e., shorter time intervals between refreshes), the data processing system 105 may appear more responsive to a user. Refreshing the display using a lower frequency may cause the data processing system 105 to appear less responsive to the user, but function longer on a single battery charge.

Figure 2:
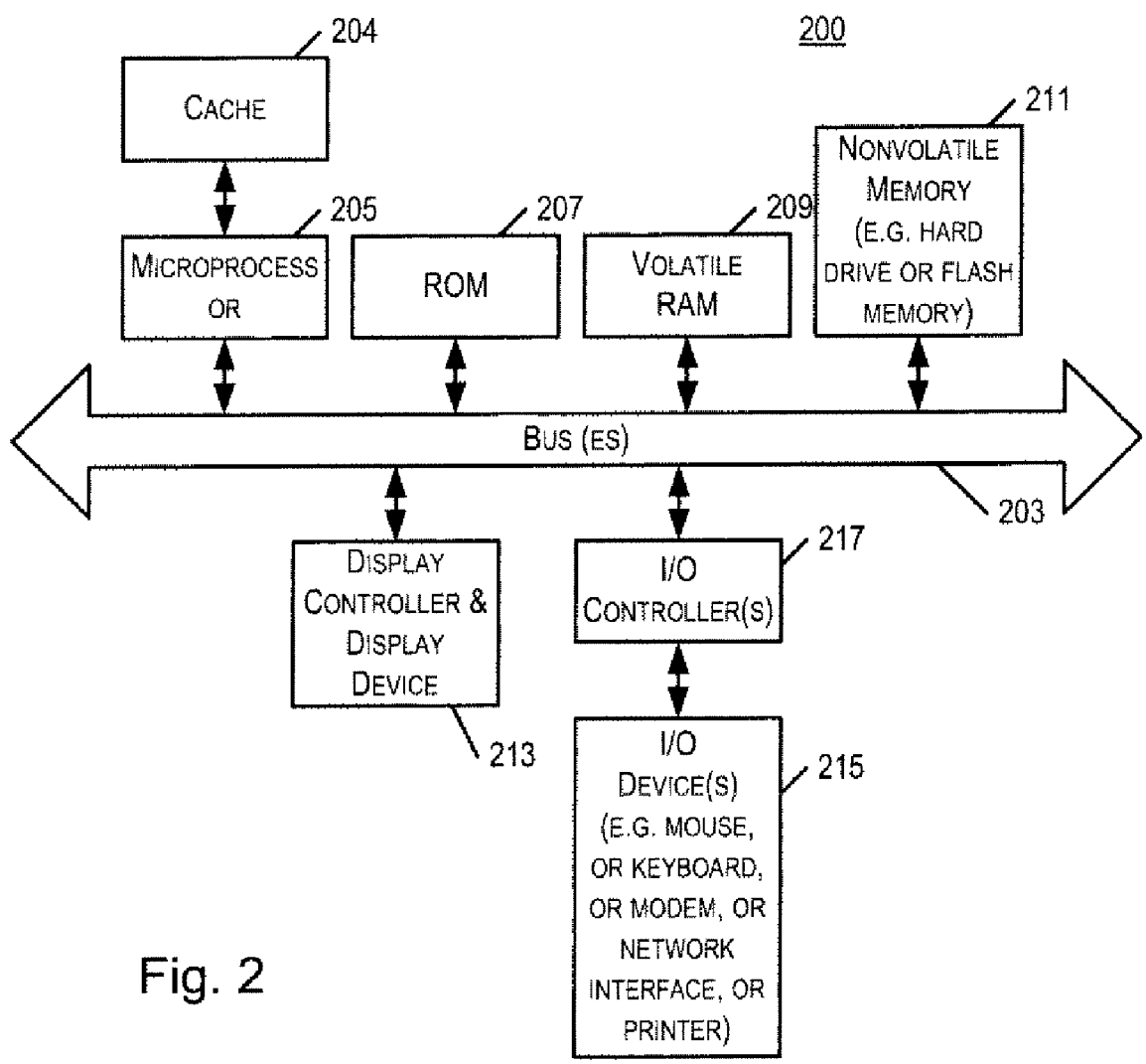
FIG. 2 shows a block diagram illustrating another data processing system suitable for the operation of an embodiment of the invention.

FIG. 2 shows one example of a data processing system which may be used with one embodiment the present invention. For example, the system 200 may be implemented as data processing system 105 as shown in FIG. 1. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 2, the computer system 200, which is a form of a data processing system, includes a bus 203 which is coupled to a microprocessor(s) 205 and a ROM (Read Only Memory) 207 and volatile RAM 209 and a non-volatile memory 211. The microprocessor 205 is coupled to cache 204. The microprocessor 205 may retrieve the instructions from the memories 207, 209, 211 and execute the instructions to perform operations described above. The bus 203 interconnects these various components together and also interconnects these components 205, 207, 209, and 211 to a display controller and display device 213 and to peripheral devices such as input/output (I/O) devices which may be mice, keyboards, modems, network interfaces, printers and other devices which are well known in the art. Typically, the input/output devices 215 are coupled to the system through input/output controllers 217. The volatile RAM (Random Access Memory) 209 is typically implemented as dynamic RAM (DRAM) which requires power continually in order to refresh or maintain the data in the memory.

The mass storage 211 is typically a magnetic hard drive or a magnetic optical drive or an optical drive or a DVD RAM or a flash memory or other types of memory systems which maintain data (e.g., large amounts of data) even after power is removed from the system (e.g., a machine-readable storage medium). Typically, the mass storage 211 will also be a random access memory although this is not required. While FIG. 2 shows that the mass storage 211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 203 may include one or more buses connected to each other through various bridges, controllers and/or adapters as is well known in the art.

Figure 3:
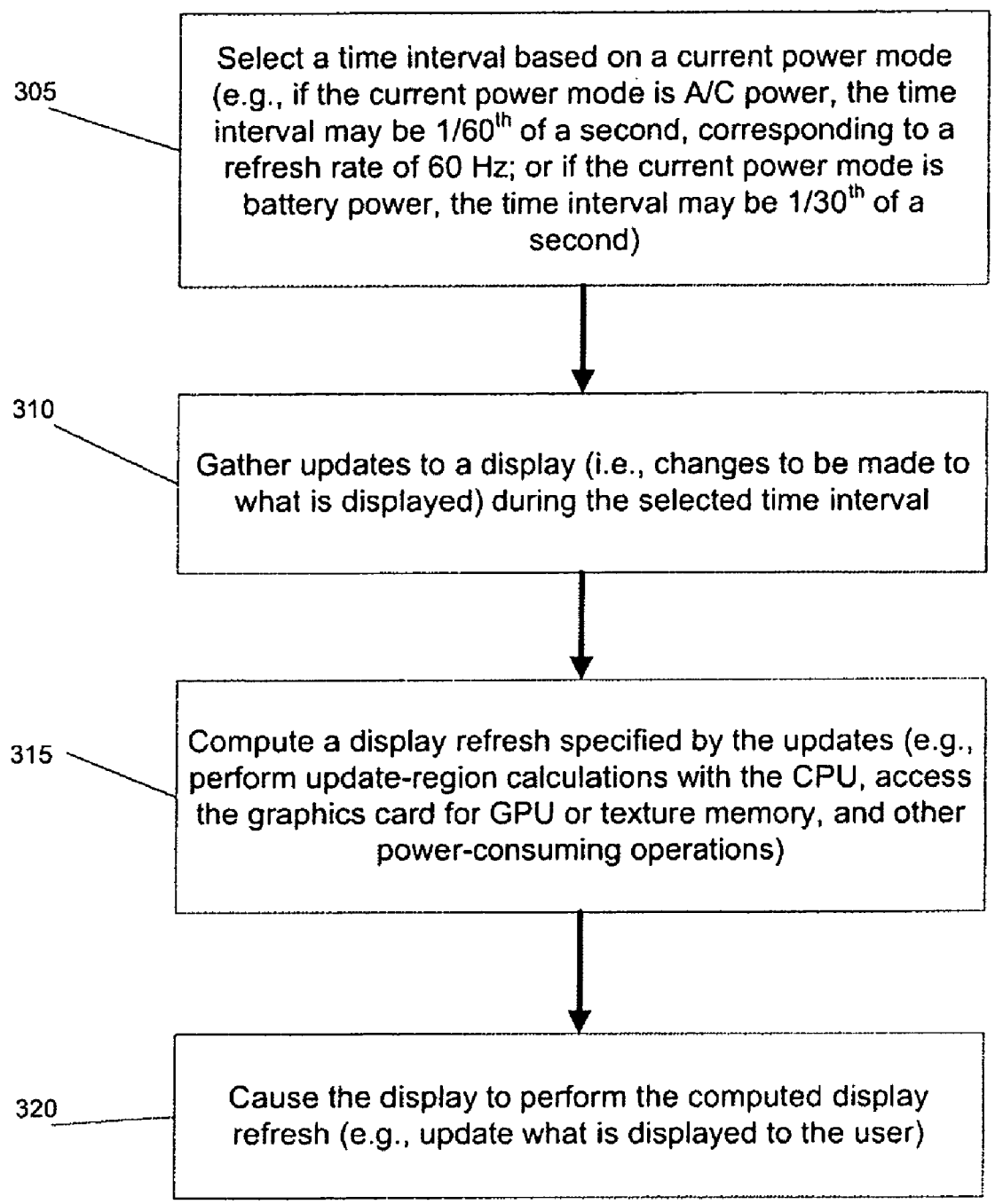
FIG. 3 is a flow diagram illustrating a method of power management improvement according to an embodiment of the invention.

FIG. 3 shows a flow diagram illustrating a method that may be performed by a data processing system to improve power management. At block 305, the method selects a time interval based on a current power mode. A power mode may be battery power, A/C power, etc. The selected time interval represents the amount of time that passes between display refreshes. For example, the interval may be $1/60^{th}$ of a second. In other words, the display would be refreshed sixty times per second. Alternatively, the interval may be $1/30^{th}$ of a second. Other intervals may be used. In another embodiment, a user configuration may specify intervals corresponding to different power modes.

As described above, frequency of display refreshes may influence the rate of power consumption. To reduce power consumption and enhance battery life, the method selects $1/30^{th}$ of a second as the time interval if the current power mode is battery power. If the current power mode is A/C power, the method selects $1/60^{th}$ of a second. At block 310, the method gathers or coalesces updates to the display. For example, processes executing on the data processing system (e.g., calendar, word processor, video game, etc.) may need to change the data being displayed. These processes may generate a request to modify the display, resulting in an update coalesced by the method. In one embodiment, the method may discard certain updates that are determined to be duplicative over the existing coalesced updates. For example, the method may determine that an update is redundant with respect to other gathered updates (i.e., would produce no relevant change in the subsequent display refresh.) The method may ignore the redundant update and/or not coalesce the update.

At block 315, shortly before the selected time interval elapses, the method stops coalescing updates and computes a display refresh (e.g., new pixels) specified for the coalesced updates. This may require CPU time to calculate the update region based on the coalesced updates. The method may also use resources on a graphics card or display adapter, such as texture memory or a graphics processing unit. Computing the display refresh may include compositing pixels and color correcting textures.

At block 320, the method causes the display to perform a refresh. The refresh causes the updated region computed at block 315 to replace obsolete data on the display. In other words, what a user may perceive on the display is changed to reflect the coalesced updates. In one embodiment, the method performs the refresh in response to an update signal.

Figure 4A:
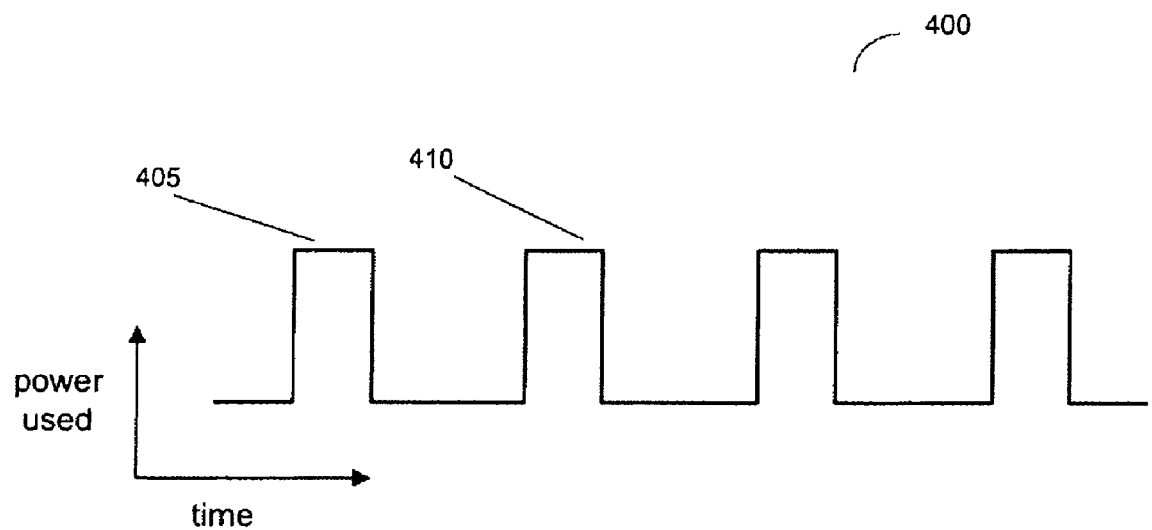
FIGS. 4A and 4B show graphs illustrating a first power mode and a second power mode according to an embodiment of the invention.
Figure 4B:
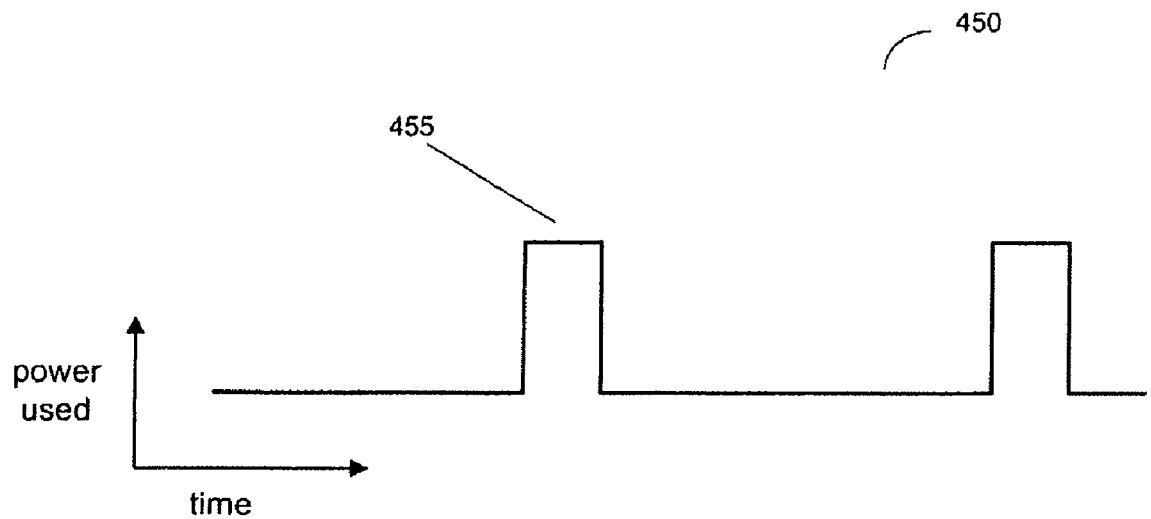

FIGS. 4A and 4B show graphs illustrating a first power mode and a second power mode according to an embodiment of the invention. Both figures show graphs where power consumption is represented by the vertical axis and the passage of time is represented by the horizontal axis. Graph 400 illustrates a "fast" refresh rate, such as $1/60^{th}$ of a second. As described above, this refresh rate may provide a more responsive display for a user. Peaks 405 and 410 correspond to power consumption associated with refreshing the display. Turning to FIG. 4B, graph 450 illustrates a "slow" refresh rate, such as $1/30^{th}$ of a second. For each peak 455 (e.g., for each refresh) at a refresh rate of $1/30^{th}$ of a second, two refreshes occur in graph 400. Power consumption over time attributable to refreshing the display is reduced when a refresh rate of $1/30^{th}$ of a second is used instead of $1/60^{th}$ of a second.

The power mode of a data processing system may change over time. For example, a laptop computer may be plugged into A/C power while a user is in the office, but may switch to battery mode while the user is in a meeting. In one embodiment, the refresh rate changes automatically when a change in power mode occurs. In another embodiment, a user configuration specifies whether the automatic switching behavior is active. The user configuration may be accessed through a graphical user interface, such as a preferences dialog box.

Some operating systems, such as Mac OS X, handle display updates with a window server. A window server acts as a single point of contact between applications running under the operating system and the graphics hardware. In such an environment, coalescing updates to the display is straightforward when implemented inside the window server, since no direct access to the graphics hardware is permitted except through the window server. In other operating systems, such as some versions of Microsoft Windows, applications may have direct access to the graphics hardware. This direct access makes coalescing updates more difficult, since there is no single point through which all updates pass. At least certain embodiments of the invention are able to work with either direct access or indirect access (e.g., through a window server).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for processing data, the method comprising:

gathering updates to a display during a time interval by a window server, wherein the window server acts as a single point of contact between applications and graphics hardware, wherein the window server ignores updates that are redundant with respect to other gathered updates, and wherein the interval has a first value if a first power mode is selected and the interval has a second value if a second power mode is selected and wherein the first value is shorter than the second value; and computing, by the graphics hardware, a display refresh specified by the gathered updates.

2. The method of claim 1 wherein computing the display refresh comprises processing by a central processing unit (CPU) and accessing a graphics card.

3. The method of claim 1 wherein the second power mode is a power-saving mode.

4. The method of claim 1 further comprising:

switching between the first power mode and the second power mode, wherein the switching occurs automatically in response to a change in power source.

5. The method of claim 1 wherein computing the display refresh comprises:

compositing pixels corresponding to the gathered updates;
color correcting textures of the pixels.

6. The method of claim 1 wherein the first power mode corresponds to A/C power and wherein the second power mode corresponds to battery power.

7. A non-transitory machine-readable storage medium storing instructions which when executed by a data processing system cause the data processing system to perform a method of processing data, the method comprising:

gathering updates to a display during a time interval by a window server, wherein the window server acts as a single point of contact between applications and graphics hardware, wherein the window server ignores updates that are redundant with respect to other gathered updates, and wherein the interval has a first value if a first power mode is selected and the interval has a second value if a second power mode is selected and wherein the first value is shorter than the second value; and computing, by the graphics hardware, a display refresh specified by the gathered updates.

8. The machine-readable storage medium of claim 7 wherein computing the display refresh comprises processing by a central processing unit (CPU) and accessing a graphics card.

9. The machine-readable storage medium of claim 7 wherein the second power mode is a power-saving mode.

10. The machine-readable storage medium of claim 7, the method further comprising:

switching between the first power mode and the second power mode, wherein the switching occurs automatically in response to a change in power source.

11. The machine-readable storage medium of claim 7, wherein computing the refresh comprises:

compositing pixels corresponding to the gathered updates;
color correcting textures of the pixels.

12. The machine-readable storage medium of claim 7, wherein the first power mode corresponds to A/C power and wherein the second power mode corresponds to battery power.

13. A data processing system comprising:

a window server to gather updates to a display during a time interval, wherein the window server acts as a single point of contact between applications and graphics hardware, wherein the window server ignores updates that are redundant with respect to other gathered updates, and wherein the interval has a first value if a first power mode is selected and the interval has a second value if a second power mode is selected and wherein the first value is shorter than the second value; and graphics hardware to compute a display refresh specified by the gathered updates.

14. The data processing system of claim 13 wherein computing the display refresh comprises processing by a central processing unit (CPU) and accessing a graphics card.

15. The data processing system of claim 13 wherein the second power mode is a power-saving mode.

16. The data processing system of claim 13 further comprising:

means for switching between the first power mode and the second power mode, wherein the switching occurs automatically in response to a change in power source.

17. The data processing system of claim 13 wherein the means for computing the refresh comprises:

means for compositing pixels corresponding to the gathered updates;
means for color correcting textures of the pixels.

* * * * *